(12) United States Patent
Sadeh

(10) Patent No.: US 6,868,186 B1
(45) Date of Patent: Mar. 15, 2005

(54) VISUAL LOSSLESS IMAGE COMPRESSION

(75) Inventor: Roni M. Sadeh, Kfar S B H (IL)

(73) Assignee: Ceva D.S.P. Ltd., Herzliya Pituach (IL)

( * ) Notice: Subject to any disclaimer, the term of this patent is extended or adjusted under 35 U.S.C. 154(b) by 842 days.

(21) Appl. No.: 09/615,774

(22) Filed: Jul. 13, 2000

(51) Int. Cl.[7] .............................. G06K 9/00; G06K 9/36; G06K 9/46
(52) U.S. Cl. ........................ 382/238; 382/166; 382/244
(58) Field of Search ................................ 382/199, 232, 382/236, 240, 166, 162, 244–247; 358/539

(56) References Cited

U.S. PATENT DOCUMENTS

| | | | |
|---|---|---|---|
| 4,794,461 A | * 12/1988 | Roberts et al. ............. 382/244 |
| 5,157,488 A | 10/1992 | Pennebaker ................ 370/225 |
| 5,168,375 A | 12/1992 | Reisch et al. ............. 382/250 |
| 5,319,724 A | 6/1994 | Blonstein et al. .......... 382/248 |
| 5,333,212 A | 7/1994 | Ligtenberg ................. 382/250 |
| 5,398,066 A | 3/1995 | Martinez-Uriegas et al. ...................... 375/240.25 |
| 5,410,354 A | 4/1995 | Uz ........................ 375/240.28 |
| 5,414,780 A | 5/1995 | Carnahan .................... 382/276 |
| 5,539,842 A | 7/1996 | Schwartz .................... 382/232 |
| 5,590,064 A | 12/1996 | Astle ....................... 708/203 |
| 5,619,594 A | 4/1997 | Melen ....................... 382/233 |
| 5,664,028 A | 9/1997 | Blonstein et al. ........... 382/248 |
| 5,671,156 A | 9/1997 | Weerackody et al. ......... 714/52 |
| H1684 H | 10/1997 | de Queiroz et al. |
| 5,675,424 A | 10/1997 | Park ...................... 358/426.07 |
| 5,675,666 A | 10/1997 | Komuro et al. ............ 382/232 |
| 5,677,689 A | 10/1997 | Yovanof et al. ............ 341/50 |
| 5,682,152 A | 10/1997 | Wang et al. ................ 341/50 |
| 5,701,468 A | 12/1997 | Benayoun et al. .......... 707/101 |
| 5,703,965 A | 12/1997 | Fu et al. ................. 382/232 |
| 5,715,176 A | 2/1998 | Mobini ..................... 709/236 |
| 5,717,815 A | 2/1998 | Nakano et al. .............. 386/53 |
| 5,719,958 A | 2/1998 | Wober et al. .............. 382/199 |
| 5,724,446 A | 3/1998 | Liu et al. .................. 382/233 |
| 5,734,755 A | 3/1998 | Ramchandran et al. ..... 382/250 |
| 5,745,097 A | 4/1998 | Cappels ..................... 345/682 |
| 5,748,807 A | 5/1998 | Lopresti et al. ............. 382/310 |
| 5,751,865 A | 5/1998 | Micco et al. ............... 382/296 |
| 5,796,434 A | 8/1998 | Lempel ..................... 348/403.1 |
| 6,259,810 B1 | * 7/2001 | Gill et al. .................. 382/245 |

FOREIGN PATENT DOCUMENTS

| | | |
|---|---|---|
| EP | 513520 A3 | 11/1992 |
| EP | 537932 A2 | 4/1993 |
| EP | 537 932 A2 | 4/1993 |
| EP | 577363 A1 | 1/1994 |
| EP | 735772 A2 | 10/1996 |
| EP | 762 775 A2 | 3/1997 |
| EP | 814 614 A2 | 12/1997 |
| EP | 833 496 A2 | 4/1998 |
| EP | 833 518 A2 | 4/1998 |
| EP | 833519 A2 | 4/1998 |

(List continued on next page.)

Primary Examiner—Leo Boudreau
Assistant Examiner—Duy M. Dang
(74) Attorney, Agent, or Firm—Eitan, Pearl, Latzer & Cohen Zedek, LLP

(57) ABSTRACT

An image compression method is provided including separating an image into a plurality of color channel sub-images processing each of the color channel sub-images by sub-sampling the sub-image transform coding the sub-sampled sub-image decoding the transform-coded image forming a plurality of square groupings of pixels in the decoded image predicting a value for a pixel within each of the x-shaped groupings determining a prediction error for each predicted pixel value within each of the square groupings coding the prediction error forming a plurality of at least partly diamond-shaped groupings of pixels in the decoded image predicting a value for a pixel within each of the diamond-shaped groupings and combining each of the processed color channel sub-images with the coded prediction errors, thereby forming a compressed image.

24 Claims, 4 Drawing Sheets

FOREIGN PATENT DOCUMENTS

| | | |
|---|---|---|
| WO | 95/04434 | 2/1995 |
| WO | 95/35628 | 12/1995 |
| WO | 96/32691 | 10/1996 |
| WO | 96/32811 | 10/1996 |
| WO | 96/33574 | 10/1996 |
| WO | 97/05748 | 2/1997 |
| WO | 97/17669 | 5/1997 |
| WO | 97/17675 | 5/1997 |
| WO | 97/36428 | 10/1997 |

* cited by examiner

VISUAL LOSSLESS IMAGE COMPRESSION

FIELD OF THE INVENTION

The present invention relates to image compression in general, and more particularly to visual lossless image compression.

BACKGROUND OF INVENTION

Various image compression techniques have been proposed to reduce the amount of data used to represent a digitized color image while, at the same time, providing quality image representation. How much the image is compressed, given in terms of a compression ratio, depends on the image itself, the technique used and the amount of information loss that can be tolerated. Some of these techniques are "lossless," meaning that they preserve all information of the original image so that it is reproduced exactly when the data is decompressed. Other techniques, commonly referred to as "lossy," discard information which is visually insignificant. By only approximating the original image rather than reproducing it exactly, lossy techniques are generally able to produce higher compression ratios than lossless techniques. In selecting the appropriate compression technique and compression ratio, the user must consider the particular image to be compressed, the desired image quality as well as transmission time and memory requirements, with the understanding that higher compression ratios lead to lower transmission times and memory requirements but also produce lower quality images.

A typical high quality digitized color image may use 24 bits per pixel (bpp)—8 bits for each of the three basic color components: red (R), green (G) and blue (B) in RGB color space or for each of the three basic luminance-chrominance components: luminance (Y), chrominance (Cb) and chrominance (Cr) in YCbCr color space. To transmit or store such images in the uncompressed state (i.e., in the spatial or pixel domain) is simply too costly in terms of time, memory, and bandwidth requirements. Thus, applications and devices which store or transmit high quality digitized color images typically do so in a compressed format.

Currently, lossless compression techniques for color images provide for compression ratios approaching 2:1, while lossy compression techniques provide for compression ratios approaching 100:1. A lossy compression technique that provides for compression ratios of between 8:1 and 20:1 while maintaining image quality approaching that of lossless compression techniques would therefore be advantageous.

SUMMARY OF THE INVENTION

In one aspect of the present invention an image compression method is provided including separating an image into a plurality of color channel sub-images processing each of the color channel sub-images by sub-sampling the sub-image transform coding the sub-sampled sub-image decoding the transform-coded image forming a plurality of square groupings of pixels in the decoded image predicting a value for a pixel within each of the x-shaped groupings determining a prediction error for each predicted pixel value within each of the square groupings coding the prediction error forming a plurality of at least partly diamond-shaped groupings of pixels in the decoded image predicting a value for a pixel within each of the diamond-shaped groupings and combining each of the processed color channel sub-images with the coded prediction errors, thereby forming a compressed image.

In another aspect of the present invention the separating step includes separating the image into red (R), green (G) and blue (B) in RBG color space.

In another aspect of the present invention the separating step includes separating the image into luminance (Y), chrominance (Cb) and chrominance (Cr) in YCbCr color space.

In another aspect of the present invention the sub-sampling step includes sub-sampling to ¼ of the sub-image size.

In another aspect of the present invention the sub-sampling step includes grouping pixels of the sub-image into a plurality of sub-sampling groupings of four mutually-adjacent pixels and retaining one pixel in each of the sub-sampling groupings.

In another aspect of the present invention each retained pixel occupies the same position in each of the sub-sampling groupings.

In another aspect of the present invention the transform coding step includes transform coding using discrete cosine transformation (DCT).

In another aspect of the present invention the transform coding step includes transform coding using wavelet transformation.

In another aspect of the present invention the transform coding step includes transforming to a compression ratio of between 4:1 and 12:1.

In another aspect of the present invention the image is a JPEG-compressed image having a first quantization table and where the transform coding step includes transforming using a second quantization table whose size is less than or equal to the size of the first quantization table of the image.

In another aspect of the present invention the predicting a value for a pixel within each of the square groupings step includes setting the predicted value to the average of the values of three of the pixels in the square grouping where the values of the three pixels are greater than a mid-value and where the value of the fourth pixel in the square grouping is less than the mid-value setting the predicted value to the average of the values of three of the pixels in the square grouping where the values of the three pixels are less than the mid-value and where the value of the fourth pixel in the square grouping is greater than the mid-value setting the predicted value to the average of the values of two diagonally-opposed pixels in the square grouping where the absolute difference between the values of the two diagonally-opposed pixels is less than a threshold and where the absolute difference between the values of the other two pixels in the square is greater than or equal to the threshold and where the predicted value is not set in any of the setting steps, setting the predicted value to the average of all of the pixels in the square grouping.

In another aspect of the present invention the mid-value is 128.

In another aspect of the present invention the determining step includes discarding the prediction error where the prediction error is greater than a maximum value or less than a minimum value.

In another aspect of the present invention the maximum value is 230 and where the minimum value is 20.

In another aspect of the present invention the determining step includes discarding the prediction error where the absolute difference between every two pixels in the square grouping is less than or equal to a first threshold.

In another aspect of the present invention the first threshold is 8.

In another aspect of the present invention the coding step includes coding using Huffman codes where the absolute difference between every two pixels in the square grouping is less than or equal to a second threshold.

In another aspect of the present invention the first threshold is 16.

In another aspect of the present invention the coding step includes entropy coding using Huffman codes where the absolute difference between any two pixels in the square grouping is greater than the second threshold.

In another aspect of the present invention the coding step includes quantizing the prediction error using a quantization factor of 4.

In another aspect of the present invention the predicting a value for a pixel within each of the diamond-shaped groupings step includes setting the predicted value to the average of a majority of the pixels in the diamond-shaped grouping where the values of the majority are greater than a mid-value and where the value of at least one remaining pixel in the diamond-shaped grouping has a value that is less than the mid-value and setting the predicted value to the average of a majority of the pixels in the diamond-shaped grouping where the values of the majority are less than a mid-value and where the value of at least one remaining pixel in the diamond-shaped grouping has a value that is greater than the mid-value.

In another aspect of the present invention the method further includes, if the predicted value is not set in any of the setting steps, setting the predicted value to the average of two horizontally-opposed pixels in the diamond-shaped grouping where the absolute difference between the values of the horizontally-opposed pixels is less than a threshold and where the absolute difference between two vertically-opposed pixels in the diamond-shaped grouping is greater than or equal to the threshold and setting the predicted value to the average of two vertically-opposed pixels in the diamond-shaped grouping where the absolute difference between the values of the vertically-opposed pixels is less than a threshold and where the absolute difference between two horizontally-opposed pixels in the diamond-shaped grouping is greater than or equal to the threshold.

In another aspect of the present invention according to claim 22 and further including if the predicted value is not set in any of the setting steps, forming a checkerboard grouping surrounding the pixel Z whose value is being predicted from six vertically-aligned and six horizontally-aligned pixels as follows:

```
. . . . . . . .   .   .   .   . . . . . . . .
. . . . . . . . V₄  .  V₁  . . . . . . . . .
. . . . . . . H₁ . H₂  . H₃ . . . . . . . .
. . . . . . . . V₂  Z  V₅  . . . . . . . . .
. . . . . . . H₄ . H₅  . H₆ . . . . . . . .
. . . . . . . . V₃  .  V₆  . . . . . . . . .
. . . . . . . .   .   .   .   . . . . . . . .
``` initializing a horizontal counter and a vertical counter to zero incrementing the horizontal counter if the absolute value of the difference between H1 and H2 is less than a threshold incrementing the horizontal counter if the absolute value of the difference between H2 and H3 is less than a threshold, incrementing the horizontal counter if the absolute value of the difference between H4 and H5 is less than a threshold incrementing the horizontal counter if the absolute value of the difference between H3 and H5 is less than a threshold incrementing the vertical counter if the absolute value of the difference between V1 and V2 is less than a threshold incrementing the vertical counter if the absolute value of the difference between V2 and V3 is less than a threshold incrementing the vertical counter if the absolute value of the difference between V4 and V5 is less than a threshold incrementing the vertical counter if the absolute value of the difference between V3 and V5 is less than a threshold setting the predicted value to the average of the vertically-aligned pixels bounding pixel Z if the horizontal counter is greater than the vertical counter and setting the predicted value to the average of the horizontally-aligned pixels bounding pixel Z if the vertical counter is greater than the horizontal counter.

In another aspect of the present invention the method further includes, if the predicted value is not set in any of the setting steps, setting the predicted value to the average of all the pixels in the diamond grouping.

The disclosures of all patents, patent applications, and other publications mentioned in this specification, and of the patents, patent applications, and other publications cited therein, are hereby incorporated by reference.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1A:
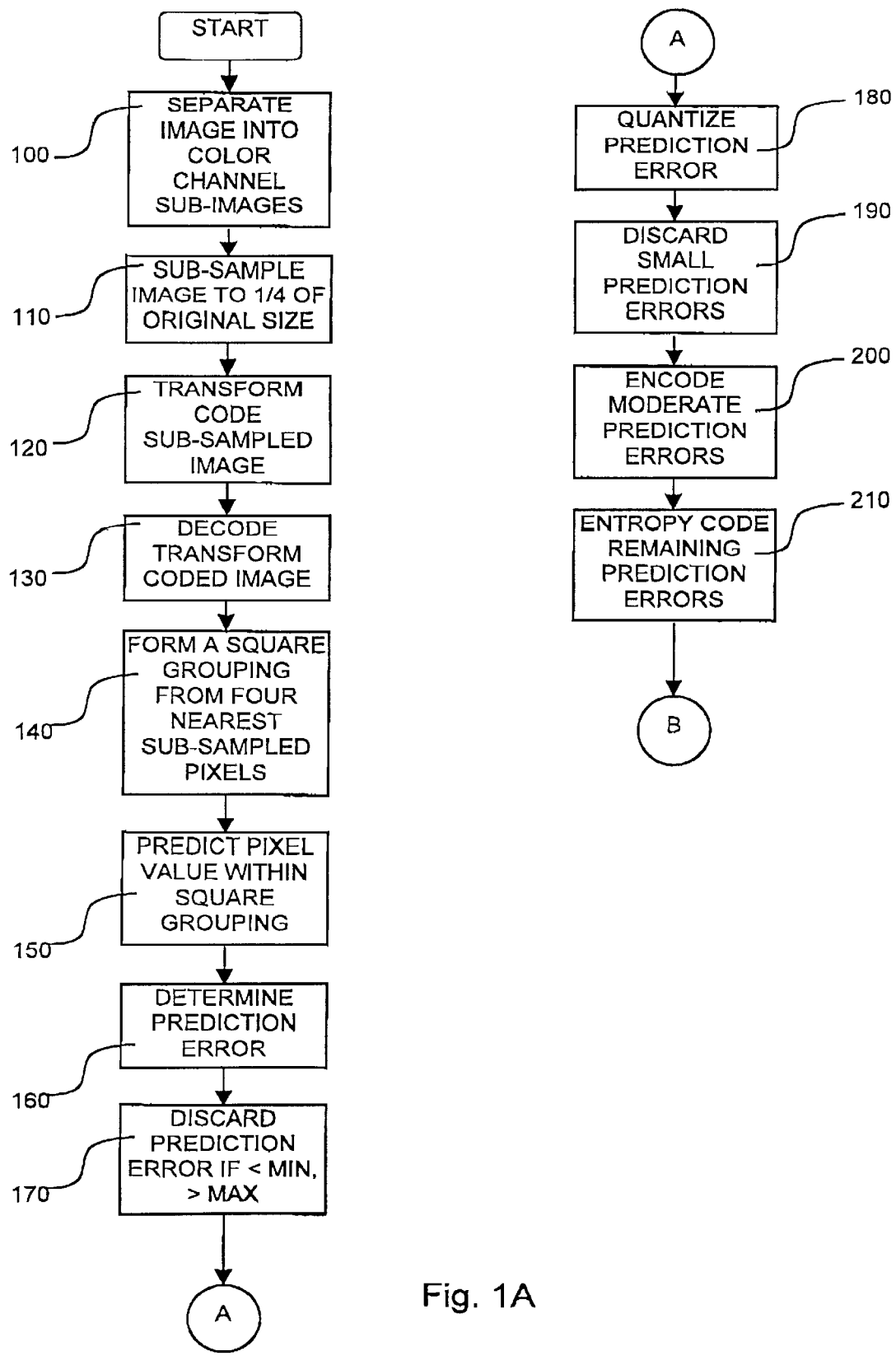
FIGS. 1A and 1B, taken together, are simplified flowchart illustration of an image compression method, operative in accordance with a preferred embodiment of the present invention.
Figure 1B:
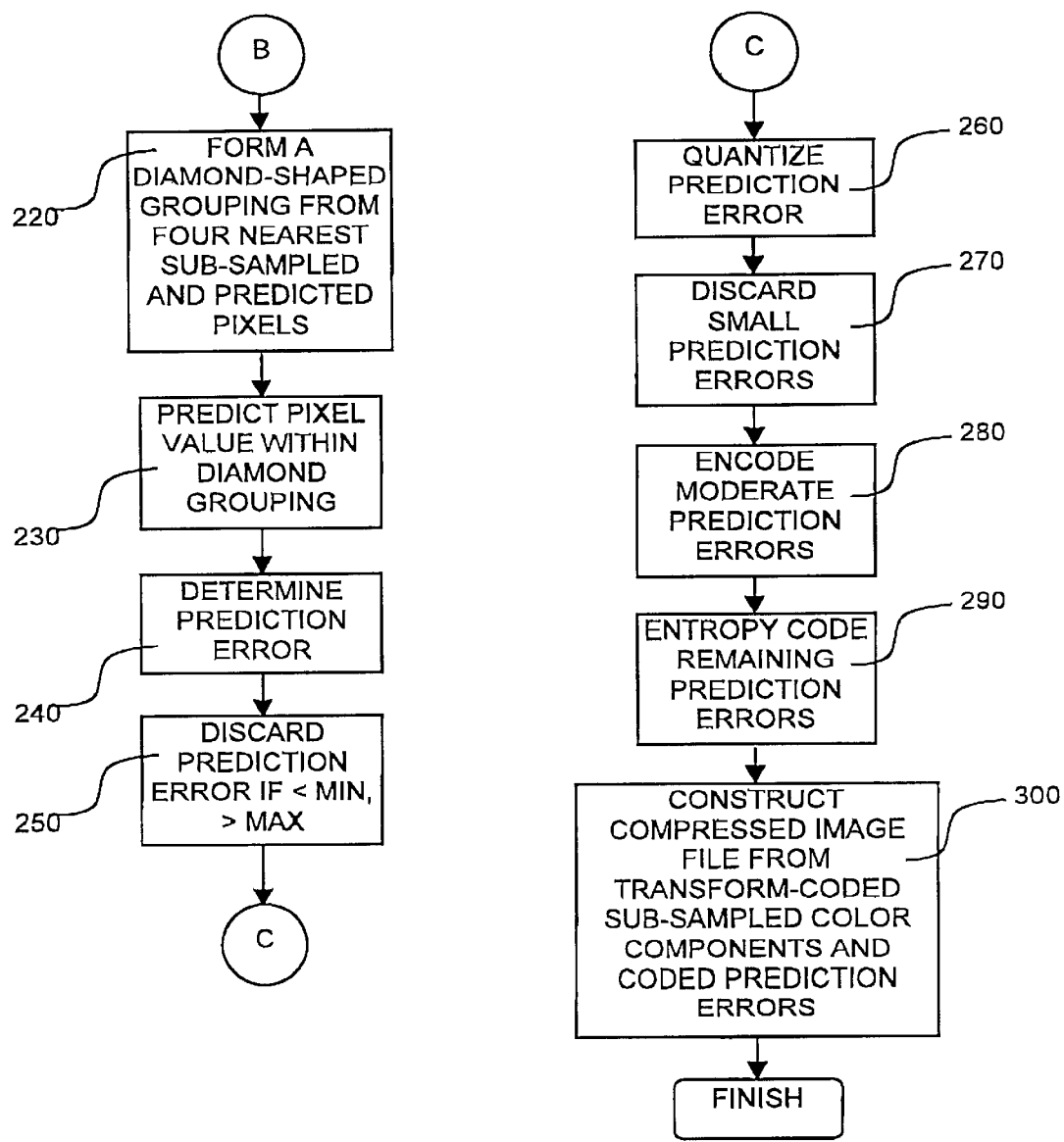
Figure 2A:
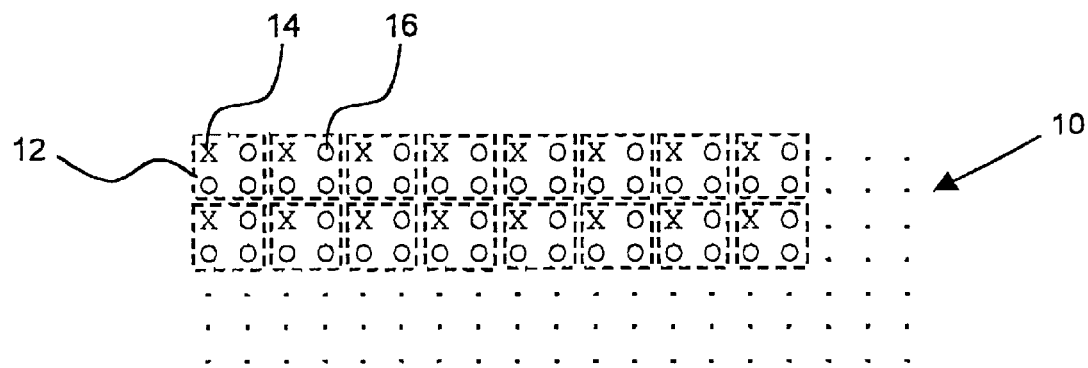
FIGS. 2A–2E are simplified pictorial illustrations of a portion of an image file useful in understanding various stages of the method of FIGS. 1A and 1B.
Figure 2B:
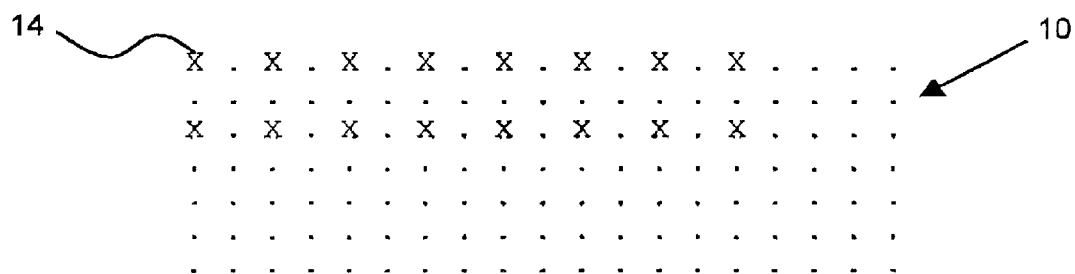

Reference is now made to FIGS. 1A and 1B, which, taken together, are simplified flowchart illustrations of an image compression method, operative in accordance with a preferred embodiment of the present invention, and FIGS. 2A–2E which are simplified pictorial illustrations of a portion of an image file useful in understanding various stages of the method of FIGS. 1A and 1B. In the method of FIGS. 1A and 1B a color or grayscale image file is separated into distinct color channel sub-images, such as red (R), green (G) and blue (B) in RGB color space or luminance (Y), chrominance (Cb) and chrominance (Cr) in YCbCr color space (step 100). Should the subject image file be stored in a compressed format, such as JPEG, the image is preferably decoded prior to color separation, Subsequent steps of the method of FIGS. 1A and 1B are then performed separately for each color channel sub-image, and references to "the image" may be understood as referring to the particular color component of the image currently being processed. The image is then sub-sampled to ¼ of the original image size (step 110). One method of sub-sampling is shown in FIG. 2A where the pixels of an image portion 10 have been grouped into groupings 12, shown in dashed lines, of four pixels represented by X's 14 and O—s 16. Only one pixel in each grouping 12 is retained, such as the X pixel 14 in the upper-left corner of each grouping 12, although any one pixel may be retained in each grouping 12 as long as each retained pixel occupies the same position in each pixel grouping. A representation of a sub-sampled image may be seen with reference to FIG. 2B.

The sub-sampled image is then transform coded using discrete cosine transform (DCT) or wavelet transform techniques (step 120). In order to maintain high visual quality, the desired compression ratio for the down-sampled image should preferably range between 4:1 to 12:1. Where the source file is a compressed JPEG file, the quantization table used should not exceed the size of the original quantization table of the JPEG file. The transform-coded image is then decoded using conventional techniques to form an approximate sub-sampled image (step 130).

Figure 2C:
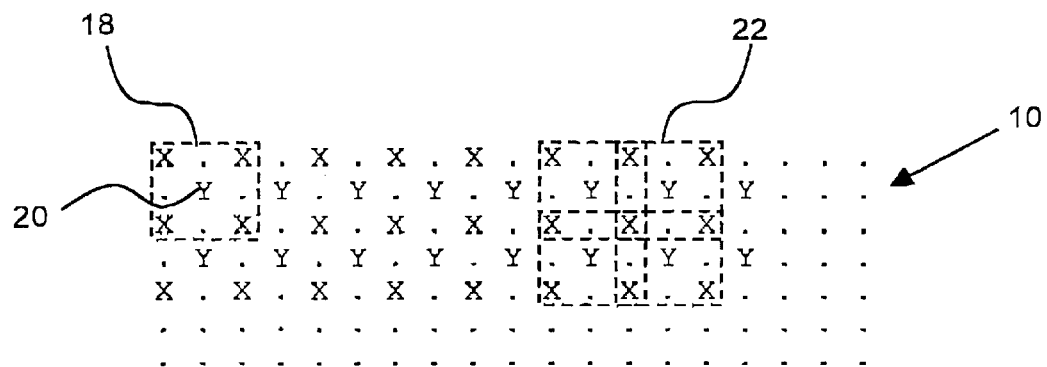

As shown in FIG. 2C, each sub-sampled pixel X is then grouped with its three closest neighbors to form a square grouping 18, shown in dashed lines (step 140). The value of a pixel 20 at the center of each square grouping 18, represented by the letter Y, is then predicted as follows (step 150):

If each of three of the X pixels has a value that is greater than a mid-value (e.g., mid-value=128 where a pixel may have a value of 0–255) and the fourth X pixel has a value that is less than the mid-value, then the value of pixel Y is set to the average of the three X pixels whose values are greater than the mid-value.

If each of three of the X pixels has a value that is less than the mid-value and the fourth X pixel has a value that is greater than the mid-value, then the value of pixel Y is set to the average of the three X pixels whose values are less than the mid-value.

If neither of the above conditions are true, then if the absolute difference between the values of two of the X pixels that are diagonally-opposed is less than a threshold (e.g., threshold=8) and the absolute difference between the values of the other two diagonally-opposed X pixels is greater than or equal to the threshold, then the value of pixel Y is set to the average of the two diagonally-opposed X pixels whose absolute difference is less than the threshold.

If none of the above conditions are met, then the value of pixel Y is set to the average of all four X pixels in the square grouping 18. The value of each Y pixel in the image is likewise determined by forming square groupings, which may overlap as shown at reference numeral 22.

Once a Y pixel value has been predicted, and typically once all the Y pixel values in the image have been predicted, its prediction error is determined and quantized as follows. The prediction error is determined by subtracting the real value of pixel Y from its predicted value (step 160). Minimum and maximum threshold values may then be set such that if Y's value exceeds a maximum value (e.g., 230) or is less than a minimum value (e.g., 20), then the prediction error is discarded (step 170). Where Y's value is within the minimum and maximum thresholds, its prediction error is then quantized (step 180). A quantization factor of 4 is believed to be sufficient to provide high visual quality, such that the quantized prediction error may be calculated as:

quantized prediction error=round (prediction error/4).

If the absolute difference between every two X pixels in the square grouping used to predict a given pixel Y is less than or equal to a first threshold (e.g., 8), then the prediction error is relatively small, and the prediction error is discarded (step 190). If the absolute difference between every two X pixels in the square grouping used to predict a given pixel Y is less than or equal to a second threshold (e.g., 16), then the prediction error is moderate and encoded using Huffman codes (step 200) The Huffman codes are preferably created based on the statistics of the prediction errors. Such statistics show that for a given threshold the errors have a very distinct distribution. If the absolute difference between any two X pixels in the square grouping is greater than the second threshold, then the prediction error is entropy coded using Huffman codes (step 210).

Figure 2D:
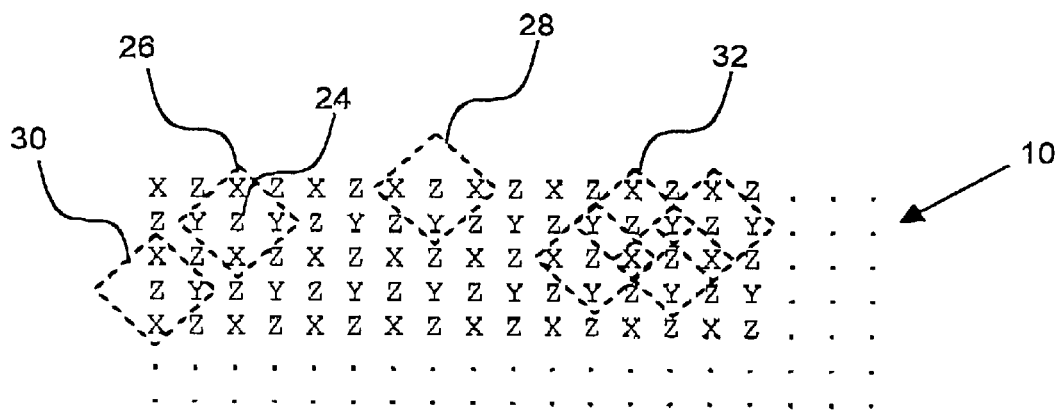

As shown in FIG. 2D, each remaining non-predicted pixel 24, represented by the letter Z, is then grouped with its closest neighboring X and Y pixels to form a diamond-shaped grouping 26, shown in dashed lines (step 220). Where a Z pixel lies on an edge of the image file, partial diamond groupings may be formed, such as are shown at reference numerals 28 and 30. Diamond groupings may also overlap other diamond groupings, as is shown at reference numeral 32. The value of pixel Z is then predicted as follows (step 230);

If a majority of the X and Y pixels have a value that is greater than a mid-value (e.g., mid-value=128 where a pixel may have a value of 0–255) and at least one remaining X or Y pixel has a value that is less than the mid-value, then the value of pixel Z is set to the average of the majority of the X and Y pixels whose values are greater than the mid-value.

If a majority of the X and Y pixels have a value that is less than a mid-value (e.g., mid-value=128 where a pixel may have a value of 0–255) and at least one remaining X or Y pixel has a value that is greater than the mid-value, then the value of pixel Z is set to the average of the majority of the X and Y pixels whose values are less than the mid-value.

If neither of the above conditions are true, then if the absolute difference between the values of the two X pixels is less than a threshold (e.g., threshold 8) and the absolute difference between the values of the two Y pixels is greater than or equal to the threshold, then the value of pixel Z is set to the average of the two X pixels. If the absolute difference between the values of the two Y pixels is less than a threshold (e.g., threshold=8) and the absolute difference between the values of the two X pixels is greater than or equal to the threshold, then the value of pixel Z is set to the average of the two Y pixels. Where two X pixels and two Y pixels are not available, such as at an edge of the image, then the above conditions cannot be met, and, therefore, the above prediction equations cannot be applied.

Figure 2E:
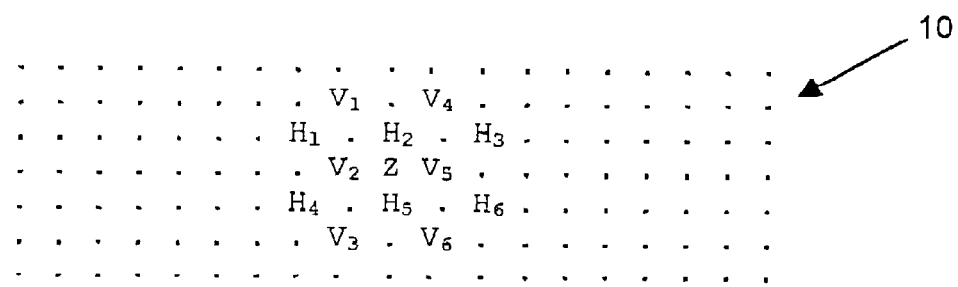

If none of the above conditions are met, then a checkerboard grouping 34 as is shown in FIG. 2E may be formed from six nearest vertically-aligned and six nearest horizontally-aligned pixels surrounding pixel Z and labeled V1-V6 and H1-H6 respectively. Where the checkerboard grouping of FIG. 2E cannot be constructed, such as at an edge of the image, then the conditions of steps 320–340 cannot be met, and, therefore, steps 310–340 are not applied. A horizontal counter and a vertical counter are initialized to zero, and a threshold is set (e.g., 8). The horizontal and vertical counters are then incremented as follows:

If abs (H2-H1)<threshold then increment the horizontal counter.

If abs (H2-H3)<threshold then increment the horizontal counter.

If abs (H5-H4)<threshold then increment the horizontal counter.

If abs (H5-H3)<threshold then increment the horizontal counter.

If abs (V2-V1)<threshold then increment the vertical counter.

If abs (V2-V3)<threshold then increment the vertical counter.

If abs (V5-V4)<threshold then increment the vertical counter.

If abs (V5-V3)<threshold then increment the vertical counter.

If the horizontal counter is greater than the vertical counter, then the value of pixel Z is set to the average of the vertically-aligned pixels bounding pixel Z. If the vertical counter is greater than the horizontal counter, then the value of pixel Z is set to the average of the horizontally-aligned pixels bounding pixel Z.

If none of the above conditions are met, then the value of pixel Z is set to the average of all the pixels in the diamond grouping 26.

Once a Z pixel value has been predicted, and typically once all the Z pixel values in the image have been predicted, its prediction error may be determined, quantized, and coded as described hereinabove for Y pixel values (steps 240–290).

A single compressed image file may be constructed using conventional techniques by combining each transform-coded sub-sampled color component of the original image file with the coded prediction errors determined above (step 300). Preferably, the size of the transform-coded portion should comprise 35%–40% of the original image file size, with the remaining 10%–15% of the file size comprising the coded prediction errors It is appreciated that one or more of the steps of any of the methods described herein may be omitted or carried out in a different order than that shown, without departing from the true spirit and scope of the invention.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. An image compression method comprising:
   separating an image into a plurality of color channel sub-images;
   processing each of said color channel sub-images by:
      sub-sampling said sub-image;
      transform coding said sub-sampled sub-image;
      decoding said transform-coded image;
      forming a plurality of square groupings of pixels in said decoded image;
      predicting a value for a pixel within each of said square groupings;
      determining a prediction error for each predicted pixel value within each of said square groupings;
      coding said prediction error;
      forming a plurality of diamond-shaped groupings of pixels in said decoded image; and
      predicting a value for a pixel within each of said diamond-shaped groupings; and
   combining each of said processed color channel sub-images with said coded prediction errors, thereby forming a compressed image.

2. A method according to claim 1 wherein said separating step comprises separating said image into red (R), green (G) and blue (B) in RBG color space.

3. A method according to claim 1 wherein said separating step comprises separating said image into luminance (Y), chrominance (Cb) and chrominance (Cr) in YCbCr color space.

4. A method according to claim 1 wherein said sub-sampling step comprises sub-sampling to ¼ of a size of said sub-image.

5. A method according to claim 4 wherein said sub-sampling step comprises:
   grouping pixels of said sub-image into a plurality of sub-sampling groupings of four mutually-adjacent pixels; and
   retaining one pixel in each of said sub-sampling groupings.

6. A method according to claim 5 wherein each retained pixel occupies the same position in each of said sub-sampling groupings.

7. A method according to claim 1 wherein said transform coding step comprises transform coding using discrete cosine transformation (DCT).

8. A method according to claim 1 wherein said transform coding step comprises transform coding using wavelet transformation.

9. A method according to claim 1 wherein said transform coding step comprises transforming to a compression ratio of between 4:1 and 12:1.

10. A method according to claim 1 wherein said image is a JPEG-compressed image having a first quantization table and wherein said transform coding step comprises transforming using a second quantization table whose size is less than or equal to the size of said first quantization table of said image.

11. A method according to claim 1 wherein said predicting a value for a pixel within each of said square groupings step comprises:
   setting said predicted value to the average of the values of three of said pixels in said square grouping where the values of said three pixels are greater than a mid-value and where the value of the fourth pixel in said square grouping is less than said mid-value;
   setting said predicted value to the average of the values of three of said pixels in said square grouping where the values of said three pixels are less than said mid-value and where the value of the fourth pixel in said square grouping is greater than said mid-value;
   setting said predicted value to the average of the values of two diagonally-opposed pixels in said square grouping where the absolute difference between the values of said two diagonally-opposed pixels is less than a threshold and where the absolute difference between the values of the other two pixels in said square is greater than or equal to said threshold; and
   where said predicted value is not set in any of said setting steps, setting said predicted value to the average of all of said pixels in said square grouping.

12. A method according to claim 11 wherein said mid-value is 128.

13. A method according to claim 1 wherein said determining step comprises discarding said prediction error where said prediction error is greater than a maximum value or less than a minimum value.

14. A method according to claim 13 wherein said maximum value is 230 and wherein said minimum value is 20.

15. A method according to claim 1 wherein said determining step comprises discarding said prediction error where the absolute difference between every two pixels in said square grouping is less than or equal to a first threshold.

16. A method according to claim 15 wherein said first threshold is 8.

17. A method according to claim 15 wherein said coding step comprises coding using Huffman codes where the absolute difference between every two pixels in said square grouping is less than or equal to a second threshold.

18. A method according to claim 17 wherein said second threshold is 16.

19. A method according to claim 17 wherein said coding step comprises entropy coding using Huffman codes where the absolute difference between any two pixels in said square grouping is greater than said second threshold.

20. A method according to claim 1 wherein said coding step comprises quantizing said prediction error using a quantization factor of 4.

21. A method according to claim 1 wherein said predicting a value for a pixel within each of said diamond-shaped groupings step comprises:

setting said predicted value to the average of a majority of said pixels in said diamond-shaped grouping where the values of said majority are greater than a mid-value and where the value of at least one remaining pixel in said diamond-shaped grouping has a value that is less than said mid-value; and setting said predicted value to the average of a majority of said pixels in said diamond-shaped grouping where the values of said majority are less than a mid-value and where the value of at least one remaining pixel in said diamond-shaped grouping has a value that is greater than said mid-value.

22. A method according to claim 21 and further comprising:

if said predicted value is not set in any of said setting steps, setting said predicted value to the average of two horizontally-opposed pixels in said diamond-shaped grouping where the absolute difference between the values of said horizontally-opposed pixels is less than a threshold and where the absolute difference between two vertically-opposed pixels in said diamond-shaped grouping is greater than or equal to said threshold; and setting said predicted value to the average of two vertically-opposed pixels in said diamond-shaped grouping where the absolute difference between the values of said vertically-opposed pixels is less than a threshold and where the absolute difference between two horizontally-opposed pixels in said diamond-shaped grouping is greater than or equal to said threshold.

23. A method according to claim 22 and further comprising:

if said predicted value is not set in any of said setting steps, forming a checkerboard grouping surrounding a pixel Z whose value is being predicted from six vertically-aligned and six horizontally-aligned pixels as follows:

```
. . . . . . . .   .   .   .   . . . . . . . .
. . . . . . . . V₄  .  V₁  . . . . . . . . .
. . . . . . . H₁ . H₂ . H₃ . . . . . . . .
. . . . . . . . V₂  Z  V₅  . . . . . . . . .
. . . . . . . H₄ . H₅ . H₆ . . . . . . . .
. . . . . . . . V₃  .  V₆  . . . . . . . . .
. . . . . . . .   .   .   .   . . . . . . . .
``` initializing a horizontal counter and a vertical counter to zero;

incrementing said horizontal counter if the absolute value of the difference between H1 and H2 is less than a threshold;

incrementing said horizontal counter if the absolute value of the difference between H2 and H3 is less than a threshold;

incrementing said horizontal counter if the absolute value of the difference between H4 and H5 is less than a threshold;

incrementing said horizontal counter if the absolute value of the difference between H3 and H5 is less than a threshold;

incrementing said vertical counter if the absolute value of the difference between V1 and V2 is less than a threshold;

incrementing said vertical counter if the absolute value of the difference between V2 and V3 is less than a threshold;

incrementing said vertical counter if the absolute value of the difference between V4 and V5 is less than a threshold;

incrementing said vertical counter if the absolute value of the difference between V3 and V5 is less than a threshold;

setting said predicted value to the average of said vertically-aligned pixels bounding pixel Z if said horizontal counter is greater than said vertical counter; and setting said predicted value to the average of said horizontally-aligned pixels bounding pixel Z if said vertical counter is greater than said horizontal counter.

24. A method according to claim 23 and further comprising:

if said predicted value is not set in any of said setting steps, setting said predicted value to the average of all the pixels in said diamond-shaped grouping.

* * * * *